(12) United States Patent
Zhang et al.

(10) Patent No.: US 9,128,891 B2
(45) Date of Patent: Sep. 8, 2015

(54) METHOD, MOBILE TERMINAL AND COMPUTER PROGRAM PRODUCT FOR SHARING STORAGE DEVICE

(75) Inventors: Fuliang Zhang, Beijing (CN); Wenying Shan, Beijing (CN); Chunhui Sun, Beijing (CN); Jinmei Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 143 days.

(21) Appl. No.: 13/260,463

(22) PCT Filed: Mar. 10, 2010

(86) PCT No.: PCT/CN2010/070954
§ 371 (c)(1),
(2), (4) Date: Sep. 26, 2011

(87) PCT Pub. No.: WO2010/108409
PCT Pub. Date: Sep. 30, 2010

(65) Prior Publication Data
US 2012/0030433 A1 Feb. 2, 2012

(30) Foreign Application Priority Data
Mar. 25, 2009 (CN) .......................... 2009 1 0080708

(51) Int. Cl.
*G06F 12/00* (2006.01)
*G06F 15/167* (2006.01)
*G06F 1/32* (2006.01)

(52) U.S. Cl.
CPC ............ *G06F 15/167* (2013.01); *G06F 1/3293* (2013.01); *Y02B 60/121* (2013.01)

(58) Field of Classification Search
CPC .... G06F 1/3293; G06F 15/167; Y02B 60/121
See application file for complete search history.

(56) References Cited

U.S. PATENT DOCUMENTS 7,650,453 B2 *  1/2010  Torii .............................. 710/240
2005/0050283 A1 *  3/2005  Miller et al. .................. 711/150
(Continued)

FOREIGN PATENT DOCUMENTS

| CN | 1922597 A | 2/2007 |
| CN | 100399318 C | 7/2008 |
| CN | 101346700 A | 10/2008 |

OTHER PUBLICATIONS

PCT/CN2010/070954 International Preliminary Report on Patentability dated Sep. 6, 2011 (5 pages).
(Continued)

*Primary Examiner* — Cheng-Yuan Tseng
*Assistant Examiner* — Ramon A Mercado
(74) *Attorney, Agent, or Firm* — Brinks Gilson & Lione; G. Peter Nichols

(57) ABSTRACT

The invention discloses a method of sharing a storage device and a mobile terminal. The mobile terminal comprises a first processor, a second processor and a readable and writable nonvolatile storage device. A processing capacity of the first processor is different from that of the second processor. A state in which the first processor is operating and using the storage device is a second state. A state in which the second processor is operating and using the storage device is a third state. The method comprising: the first processor receiving a switch instruction; the first processor controlling the storage device to enter the second state or the third state according to the switch instruction. As compared with the prior art, by controlling the sharing of the storage device by the first processor, the invention reduces the elements in the mobile terminal and saves the hardware cost of the mobile terminal; moreover, the physical connection between the components in the mobile terminal is simple and easily controlled.

9 Claims, 7 Drawing Sheets

(56) References Cited

U.S. PATENT DOCUMENTS

| | | |
|---|---|---|
| 2005/0144401 A1 | 6/2005 | Pantalone et al. |
| 2006/0136677 A1* | 6/2006 | Fuhs et al. .................... 711/147 |
| 2008/0256374 A1* | 10/2008 | Harris et al. .................. 713/323 |
| 2009/0019248 A1* | 1/2009 | Jeong et al. ................... 711/163 |
| 2011/0055434 A1* | 3/2011 | Pyers et al. .................... 710/14 |

OTHER PUBLICATIONS

PCT/CN2010/070954 International Search Report dated May 28, 2010 (4 pages).

Chinese First Office Action with English Translation for related Application No. 200910080708.1 dated Apr. 19, 2011, 12 pages.

Chinese Second Office Action with English Translation for related Application No. 200910080708.1 dated Dec. 16, 2011, 14 pages.

* cited by examiner

METHOD, MOBILE TERMINAL AND COMPUTER PROGRAM PRODUCT FOR SHARING STORAGE DEVICE

BACKGROUND

The invention relates to the field of computer communication technology, in particular to a method for sharing storage device, a mobile terminal and computer program product.

Existing mobile terminal generally comprises two processors which are ARM processor and X86 processor respectively, in which, ARM processor generally is of low power consumption and low speed, thereby has long stand-by time and can support only those applications with relatively low complexity; whereas X86 processor generally is of high speed and high power consumption, may support general purpose Window operation system, and may process those tasks having a higher processing capacity requirement.

In related art, for sharing data, the hybrid system of ARM processor and X86 processor may generally employ a way of sharing a storage, wherein one storage access controller and a plurality of multiplexers are setup between the ARM processor and the X86 processor for selecting among address, data and control signal. The storage access controller has one control register, comprising a first storage device corresponding to the ARM processor and a second storage device corresponding to the X86 processor. The storage access controller receives an access request via the two storage devices, generates a selection signal as a selection switch of the multiplexer, and controls storage to be used by ARM processor or X86 processor through logical judgment.

In the study on the related art, the inventor found that, when the ARM processor and the X86 processor share a storage, it is necessary to setup elements including storage access controller and multiplexer etc. in the mobile terminal, thereby increasing the hardware cost of the mobile terminal; and the storage access controller generates selection signal according to the access requests from the two processors, which has a complicated internal logic control process, thereby increasing the complexity of sharing a storage.

SUMMARY

The invention is directed to provide a method, a mobile terminal and computer program product of sharing storage device, thereof to solve the problem of the increased hardware cost of mobile terminal due to the need of increasing a lot of elements for sharing storage device.

In order to solve aforementioned technical problems, the invention provides a technical solution as follows:

A method of sharing a storage device, applicable to a mobile terminal comprising a first processor, a second processor and a readable and writable nonvolatile storage device, wherein a processing capacity of the first processor is different from that of the second processor, a state in which the first processor is operating and using the storage device is a second state, a state in which the second processor is operating and using the storage device is a third state, the method comprising:

the first processor receiving a switch instruction;

the first processor controlling the storage device to enter the second state or the third state according to the switch instruction.

A state in which the first processor is operating without using the storage device is a first state. The method further comprises:

the first processor being connected to the storage device after the mobile terminal is powered on;

the first processor controlling the storage device to be in power down state, and the mobile terminal entering the first state.

The method further comprises:

in the first state, the first processor receiving an instruction for switching to the second state;

the first processor controlling the storage device to be in power up state according to the instruction, and the mobile terminal entering the second state.

The method further comprises:

in the second state, the first processor receives an instruction for switching to the first state;

the first processor controlling the storage device to be in power down state according to the instruction, the mobile terminal entering the first state.

In the second state, the first processor receives an instruction for switching to the third state;

the first processor controlling the storage device to enter the third state according to the switch instruction comprises:

after receiving the instruction, the first processor changing a switch which is set previously from being connected to the first processor to being connected to the second processor; the first processor controlling the storage device to be in power up state, the mobile terminal entering the third state; or after receiving the instruction, the first processor establishing a direct connection channel between the storage device and the second processor; the first processor controlling the storage device to be in power up state, the mobile terminal entering the third state.

In the third state, the first processor receives an instruction for switching to the second state;

the first processor controlling the storage device to enter the second state according to the switch instruction comprises:

after receiving the instruction, the first processor changing a switch which is set previously from being connected to the second processor to being connected to the first processor; the first processor controlling the storage device to be in power up state, the mobile terminal entering the second state; or after receiving the instruction, the first processor disconnecting the established direct connection channel between the storage device and the second processor; controlling the storage device to be in power up state by the first processor, the mobile terminal entering the second state.

A state in which the first processor is operating without using the storage device is a first state. The method further comprises:

in the third state, the first processor receiving an instruction for switching to the first state;

the first processor controlling the storage device to enter the first state according to the instruction.

The first processor controlling the storage device to enter the first state according to the instruction b comprises:

after receiving the instruction, the first processor changing a switch which is set previously from being connected to the second processor to being connected to the first processor; the first processor controlling the storage device to be in power down state, the mobile terminal entering the first state; or after receiving the instruction, the first processor disconnecting the established direct connection channel between the storage device and the second processor; the first processor controlling the storage device to be in power down state, the mobile terminal entering the first state.

The method further comprises:

in the first state, the first processor receiving an instruction for switching to the third state;

the first processor controlling the storage device to enter the third state according to the instruction.

the first processor controlling the storage device to enter the third state according to the instruction comprises:

after receiving the instruction, the first processor changing a switch which is set previously from being connected to the first processor to being connected to the second processor; the first processor controlling the storage device to be in power up state, the mobile terminal entering the third state; or after receiving the instruction, the first processor establishing a direct connection channel between the storage device and the second processor; the first processor controlling the storage device to be in power up state, the mobile terminal entering the third state.

A mobile terminal comprises a first processor, a second processor and a readable and writable nonvolatile storage device, wherein a processing capacity of the first processor is different from that of the second processor, a state in which the first processor is operating and using the storage device is a second state, a state in which the second processor is operating and using the storage device is a third state, the first processor comprising:

a receiving unit, for receiving an switch instruction;

a controlling unit, for controlling the storage device to enter the second state or the third state according to the switch instruction.

A state in which the first processor is operating without using the storage device is a first state. The first processor further comprises:

an initialization unit, for connecting to the storage device after the mobile terminal is powered on and controlling the storage device to be in power down state, the mobile terminal entering the first state.

The receiving unit further comprises: a first receiving unit, for receiving an instruction for switching to the second state in the first state.

The controlling unit further comprises: a first controlling unit, for controlling the storage device to be in power up state according to the instruction, the mobile terminal entering the second state.

The receiving unit further comprises: a second receiving unit, for receiving an instruction for switching to the first state in the second state.

The controlling unit further comprises: a second controlling unit, for controlling the storage device to be in power down state according to the instruction, the mobile terminal entering the first state.

The receiving unit comprises: a third receiving unit, for receiving an instruction for switching to the third state in the second state.

The controlling unit comprises: a third controlling unit, for changing a switch which is set previously from being connected to the first processor to being connected to the second processor, and controlling the storage device to be in power up state, wherein the mobile terminal entering the third state, or for establishing a direct connection channel between the storage device and the second processor and controlling the storage device to be in power up state, wherein the mobile terminal entering the third state.

The receiving unit comprises: a fourth receiving unit, for receiving an instruction for switching to the second state in the second state.

The controlling unit comprises: a fourth controlling unit, for changing a switch which is set previously from being connected to the second processor to being connected to the first processor, and controlling the storage device to be in power up state, wherein the mobile terminal entering the second state, or for disconnecting the established direct connection channel between the storage device and the second processor and controlling the storage device to be in power up state, wherein the mobile terminal entering the second state.

A state in which the first processor is operating without using the storage device is a first state, and the receiving unit further comprises: a fifth receiving unit, for receiving an instruction for switching to the first state in the third state.

The controlling unit further comprises: a fifth controlling unit, for changing a switch which is set previously from being connected to the second processor to being connected to the first processor, and controlling the storage device to be in power down state, wherein the mobile terminal entering the first state, or for disconnecting the established direct connection channel between the storage device and the second processor and controlling the storage device to be in power down state, wherein the mobile terminal entering the first state.

The receiving unit further comprises: a sixth receiving unit, for receiving an instruction for switching to the third state in the first state.

The controlling unit comprises: a sixth controlling unit, for changing a switch which is set previously from being connected to the first processor to being connected to the second processor, and controlling the storage device to be in power up state, wherein the mobile terminal entering the third state, or for establishing a direct connection channel between the storage device and the second processor and controlling the storage device to be in power up state, wherein the mobile terminal entering the third state.

The mobile terminal further comprises a message channel between the first processor and the second processor, for communicating messages between the first processor and the second processor.

A computer program product comprises a computer usable media implementing a computer usable program, the computer usable program being incorporated into aforesaid mobile terminal, the program enables the first processor to receive a switch instruction; enables the first processor to control the storage device to enter the second state or the third state according to the switch instruction.

It can be seen from the above technical solution of the invention that, the embodiments of the invention are applied to a mobile terminal having a first processor, a second processor and a storage device, wherein the first processor controls the storage device to enter a second state in which it is used by the first processor or a third state in which it is used by the second processor after receiving a switch command. As compared with the prior art, the invention reduces the elements in the mobile terminal and saves the hardware cost of the mobile terminal. Moreover, the physical connection between the components in the mobile terminal is simple and easily controlled.

DETAILED DESCRIPTION

The invention provides a method and mobile terminal of sharing a storage device. The further detailed description of the invention will be made with reference to the attached drawings and the detailed description so that the technical solution of the invention can be well understood by those skilled in the art, and the above purpose, features and advantages of the invention can be more apparent and easily understood.

The mobile terminal of the invention embodiment comprises a first processor and a second processor, both of which may use readable and writable nonvolatile storage device independently, wherein, the processors inside the mobile terminal of the invention embodiment mainly comprise, when sharing a storage device, three states: a first state in which the first processor is operating without using the storage device, a second state in which the first processor is operating and using the storage device, and a third state in which the second processor is operating and using the storage device.

Figure 1:
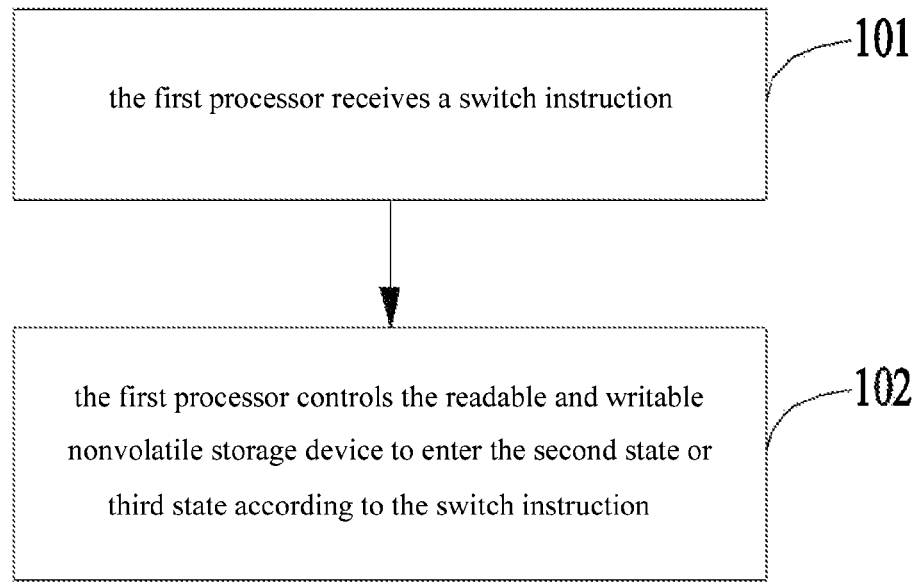
FIG. 1 is a flow chart of the first embodiment of the method of sharing storage device of the invention.

The first embodiment flow of the method of sharing a storage device of the invention is shown in FIG. 1:

Step 101: the first processor receives a switch instruction.

Step 102: the first processor controls the readable and writable nonvolatile storage device to enter the second state or third state according to the switch instruction.

Figure 2:
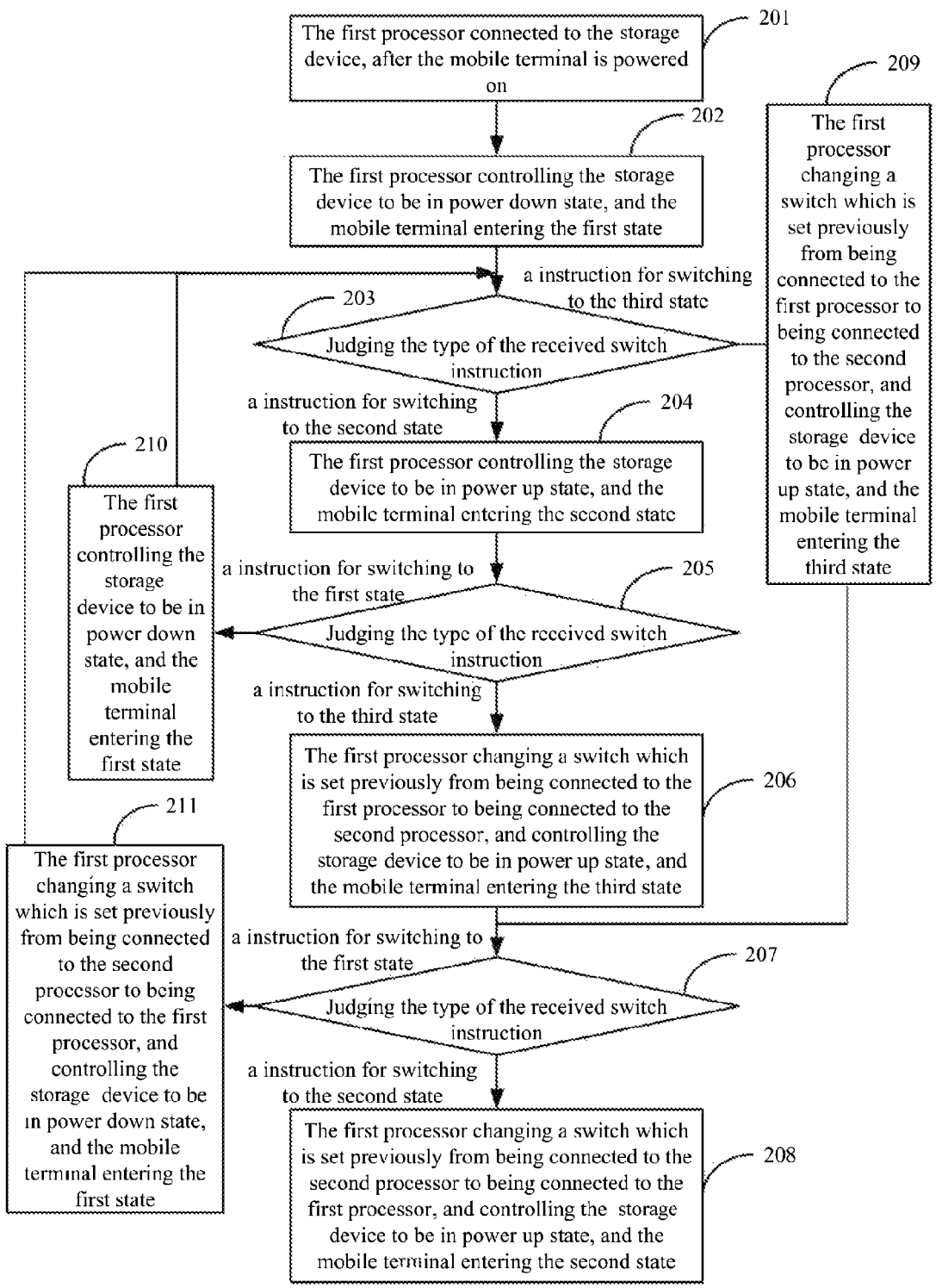
FIG. 2 is a flow chart of the second embodiment of the method of sharing storage device of the invention.

The second embodiment flow of the method of sharing a storage device of the invention is shown in FIG. 2, which shows a process in which the first processor controls a switch so that different processors inside the mobile terminal may share a storage device.

Step 201: after the mobile terminal is powered on, the first processor is connected to the storage device.

Step 202: the first processor controls the storage device to be in power down state, and the mobile terminal enters the first state.

Step 203: judges the type of the received switch instruction, and if it is an instruction for switching to the second state, executes step 204; if it is an instruction for switching to the third state, executes step 209.

Step 204: the second processor controls the storage device to be in power up state, and the mobile terminal enters the second state.

Step 205: judges the type of the received switch instruction, and if it is an instruction for switching to the third state, executes step 206; if it is an instruction for switching to the first state, executes step 210.

Step 206: the first processor changes a switch which is set previously from being connected to the first processor to being connected to the second processor, and controls the storage device to be in power up state, and the mobile terminal enters the third state.

Step 207: judges the type of the received switch instruction, and if it is an instruction for switching to the second state, executes step 208; if it is an instruction for switching to the first state, executes step 211.

Step 208: the first processor changes a switch which is set previously from being connected to the second processor to being connected to the first processor, and controls the storage device to be in power up state, and the mobile terminal enters the second state, returns to step 205.

Step 209: the first processor changes a switch which is set previously from being connected to the first processor to being connected to the second processor, and controls the storage device to be in power up state, and the mobile terminal enters the third state, returns to step 207.

Step 210: the first processor controls the storage device to be in power down state, and the mobile terminal enters the first state, returns to step 203.

Step 211: the first processor changes a switch which is set previously from being connected to the second processor to being connected to the first processor, and controls the storage device to be in power down state, and the mobile terminal enters the first state, returns to step 203.

Figure 3:
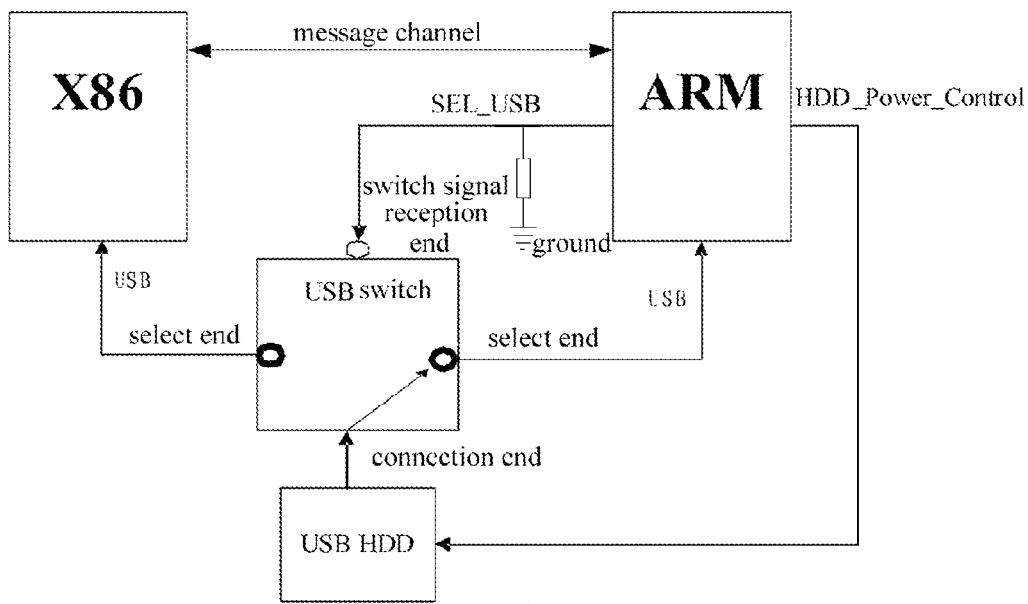
FIG. 3 is a schematic diagram of internal structure of a mobile terminal of the invention.

FIG. 3 is a schematic diagram of the internal structure of a mobile terminal to which the above embodiment is applied. The mobile terminal comprises an ARM processor as the first processor, an X86 processor as the second processor, and a switch circuit. Taking USB switch for example, one select end of the USB switch is connected to the ARM processor, another select end of the USB switch is connected to the X86 processor, and the switch signal reception end (SEL_USB) is connected to the ARM processor. The switch signal SEL_USB is pulled down to be connected to the ground. The switching of the USB switch is controlled by the ARM processor. The connection end of the USB switch is connected to a hard disk drive (HDD). Taking USB HDD for example, the ARM processor and X86 processor share the USB HDD. The control of USB switch circuit by the USB HDD via the ARM processor may select to switch to the ARM processor or the X86 processor. The ARM processor also is directly connected to the USB HDD so as to transmit a control signal (HDD_Power_Control) to the USB HDD and to control the power up or power down of the USB HDD according to a usage condition of the USB HDD. There is one message channel between the X86 processor and ARM processor, which may be implemented by I2C, UART serial port and etc., for communicating(delivering) state information and messages indicating whether it is necessary to switch between the X86 processor and ARM processor.

Wherein, the ARM processor controls that whether the USB HDD is powered up and the switching (SEL_USB) of the switch circuit USB switch, because in the mobile terminal, the ARM processor is always in power up operating mode due to low power consumption, whereas the X86 processor may not be powered up for a time period due to high power consumption. Therefore, due to always being powered up, the ARM processor is more convenient and more direct than the X86 processor in terms of control logic. Further, due to employing general purpose input/output (GPIO) interface to transmit control signaling, the ARM processor has a simpler control mode than the X86 processor.

When the ARM processor is controlling, in a case that the X86 processor is powered off or in deep sleep, the ARM processor may control the USB switch to be connected to itself as required, and then access the content of the USB HDD via USB; when operating alone, the ARM processor may also power off the USB HDD by transmitting HDD_Power_Control to reduce the power consumption of the mobile terminal; when the X86 processor is operating, the ARM processor is connected to the X86 processor by controlling the USB switch by SEL_USB, and controls the USB HDD to power up by HDD_Power_Control.

Figure 4:
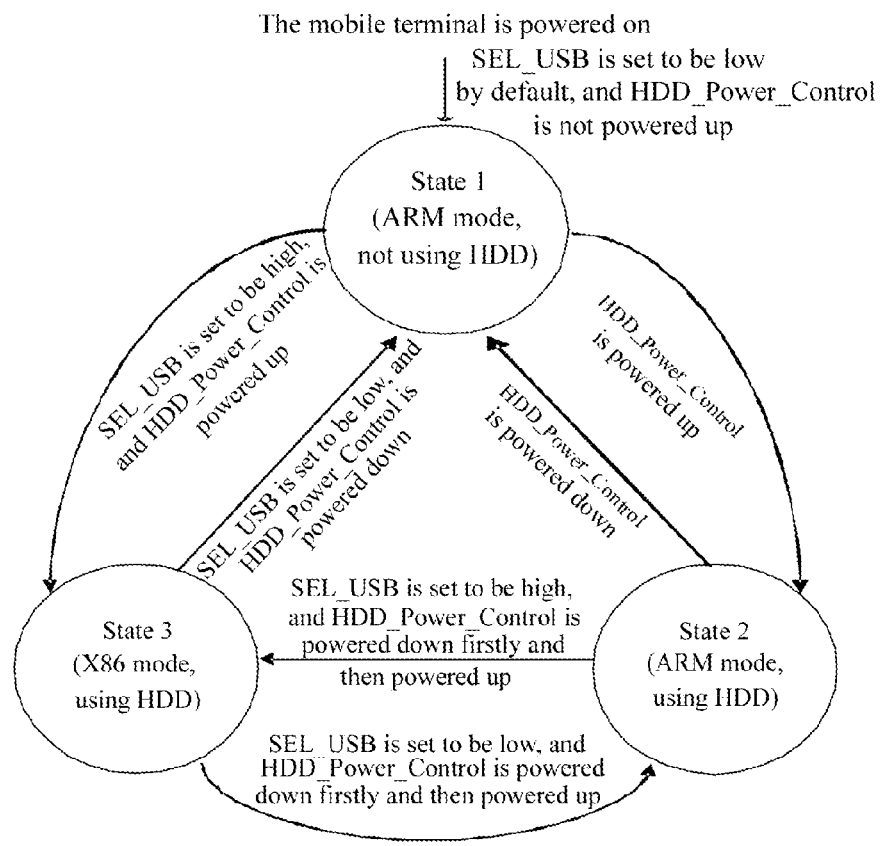
FIG. 4 is a schematic diagram of state transition of applying the second embodiment of the method of the invention.

FIG. 4 is a schematic diagram of transition among states to which the above embodiment is applied. The detailed description of the process of transition among respective states will be made below in conjunction with structural representation of mobile terminal as shown in FIG. 3.

First of all, the possible states for the mobile terminal are defined:

State 1: indicates that the ARM processor is operating but does not use the USB HDD, whereas the X86 processor is in power down or deep sleep state;

It should be noted that, in the invention embodiment, the ARM processor include a flash storage which stores the operation system started by the ARM processor, therefore there is no need to store the operation system of the ARM processor in HDD, that is, the HDD is corresponding to one external storage device of the ARM processor system.

State 2: indicates that the ARM processor is operating and using the USB HDD simultaneously, whereas the X86 processor is in power down or deep sleep state;

State 3: indicates that the X86 processor is operating and using the USB HDD simultaneously, whereas the ARM enters a standby state but still maintains the connection between the USB HDD and X86 processor.

It should be noted that, the operation system started by the X86 processor in the invention embodiment is stored in the HDD. The HDD is corresponding to a component of the X86 processor system.

Secondly, the transition among states will be described:

Initially powering on and entering state 1: after the mobile terminal initially powered on, the USB HDD is connected to the ARM processor by default, and the ARM processor is not using the USB HDD, therefore the USB HDD is in a power down state in order to save power consumption.

Transiting from state 1 to state 2: when the ARM processor needs to use USB HDD, the ARM processor transmits a HDD_Power_Control signal to the USB HDD to control it to be powered up.

Transiting from state 2 to state 3: when the X86 processor needs to use USB HDD, the ARM processor controls the USB switch as so to change the USB switch from being connected to the ARM processor to being connected to the X86 processor, wherein the switching may apply the manner in which SEL_USB is set to be high (predefining that the USB switch is connected to the X86 processor when SEL_USB is high, and the USB switch is connected to the ARM processor when SEL_USB is low) At the same time the ARM processor may further transmit HDD_Power_Control signal to the USB HDD, and controls USB HDD to power down at first and then power up, in order to ensure the hard disk is in a normal condition when the X86 processor is operating.

Transiting from state 3 to state 1: when either the X86 processor or the ARM processor has no need to use USB HDD, the ARM processor controls the USB switch as so to change the USB switch from being connected to the X86 processor to being connected to the ARM processor, wherein the switching may apply the manner in which SEL_USB is set to be low. At the same time the ARM processor transmits HDD_Power_Control signal to the USB HDD and controls the USB HDD to power down.

Transiting from state 1 to state 3: when the X86 processor needs to use USB HDD, the ARM processor controls the USB switch as so to changes the USB switch from being connected to the ARM processor to being connected to the X86 processor, wherein the switching may apply the manner in which SEL_USB is set to be high. At the same time the ARM processor transmits HDD_Power_Control signal to the USB HDD and controls the USB HDD to power up.

Transiting from state 3 to state 2: when the ARM processor needs to use USB HDD, it controls the USB switch as so to change the USB switch from being connected to the X86 processor to being connected to the ARM processor, wherein the switching may apply the manner in which SEL_USB is set to be low. At the same time the ARM processor may further transmit HDD_Power_Control signal to the USB HDD and controls the USB HDD to power down at first and then power up to ensure the hard disk is in a normal condition when the ARM processor is operating, Transiting from state 2 to state 1: when the ARM processor has no need to use USB HDD, it transmits a HDD_Power_Control signal to the USB HDD to control it to be powered down.

It can be seen from the above embodiment, with compared with existing solution of sharing a storage device, the invention implements the sharing a storage device by controlling the switch circuit by the ARM processor, therefore, the invention has simple physical connection and logic control circuit among components in the mobile terminal, the state switching logic is simple, and can be easily implemented by software.

Figure 5:
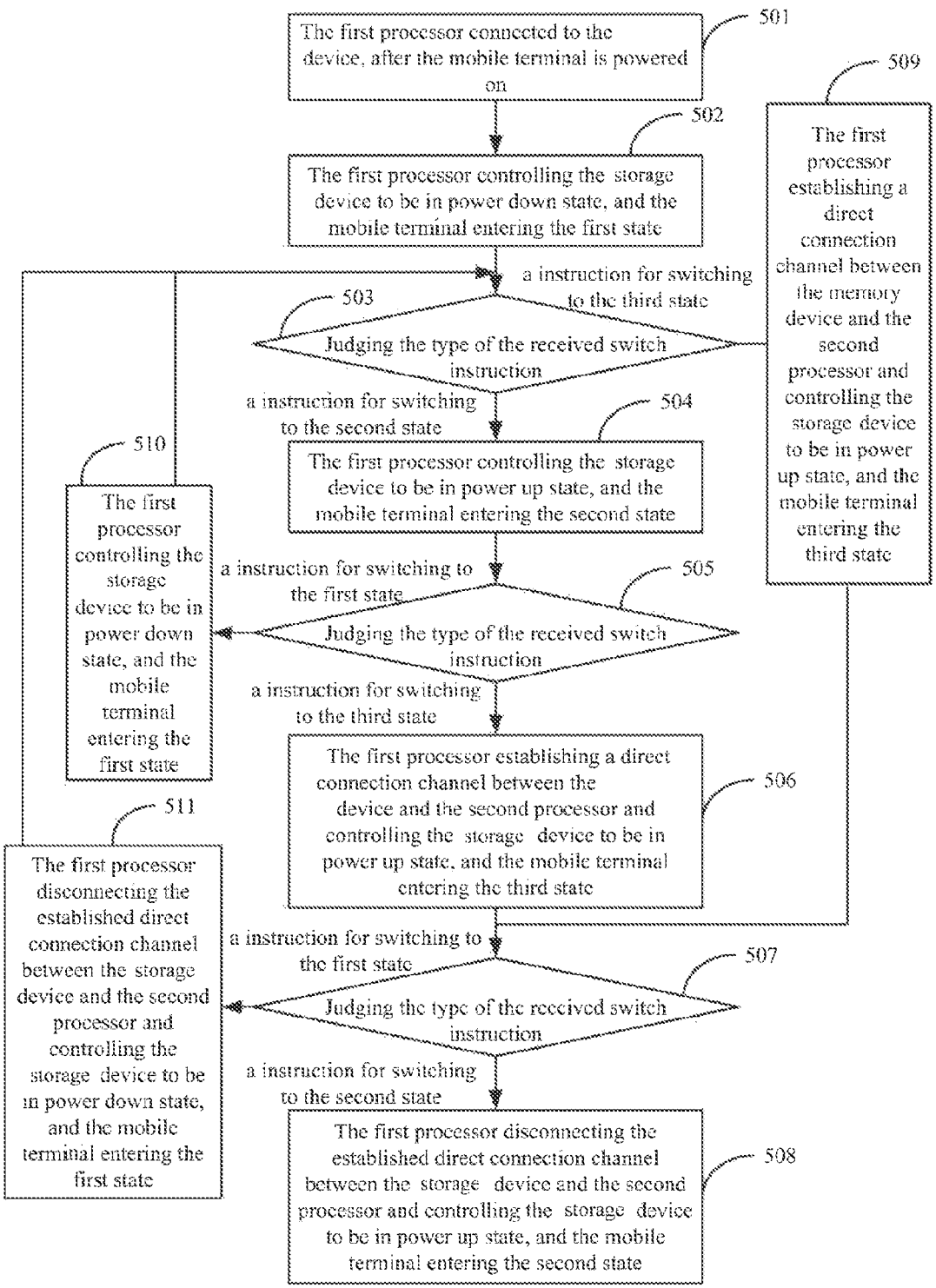
FIG. 5 is a flow chart of the third embodiment of the method of sharing storage device of the invention.

The flow of third embodiment of the method of sharing a storage device of the invention is shown in FIG. 5, which shows a process in which the first processor establishes or disconnects a directly connection channel so that different processors in the mobile terminal may share a storage device.

Step 501: after the mobile terminal is powered on, the first processor is connected to the storage device.

Step 502: the first processor controls the storage device to be in power down state, and the mobile terminal enters the first state.

Step 503: judges the type of the received switch instruction, and if it is an instruction for switching to the second state, executes step 504; and if it is an instruction for switching to the third state, executes step 509.

Step 504: the first processor controls the storage device to be in power up state, and the mobile terminal enters the second state.

Step 505: judges the type of the received switch instruction, and if it is an instruction for switching to the third state, executes step 506; and if it is an instruction for switching to the first state, executes step 510.

Step 506: the first processor establishes a direct connection channel between the storage device and the second processor and controls the storage device to be in power up state, and the mobile terminal enters the third state.

Step 507: judges the type of the received switch instruction, and if it is an instruction for switching to the second state, executes step 508; and if it is an instruction for switching to the first state, executes step 511.

Step 508: the first processor disconnects the established direct connection channel between the storage device and the second processor and controls the storage device to be in power up state, the mobile terminal enters the second state, and returns to step 505.

Step 509: the first processor establishes a direct connection channel between the storage device and the second processor and controls the storage device to be in power up state, the mobile terminal enters the third state, and returns to step 507.

Step 510: the first processor controls the storage device to be in power down state, the mobile terminal enters the first state, and returns to step 503.

Step 511: the first processor disconnects the established direct connection channel between the storage device and the second processor and controls the storage device to be in power down state, the mobile terminal enters the first state, and returns to step 503.

Figure 6:
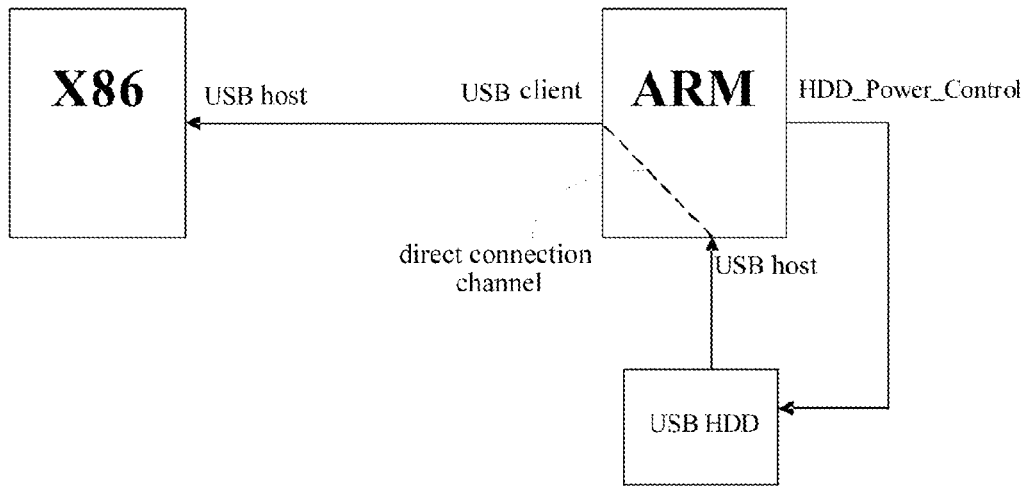
FIG. 6 is a schematic diagram of another internal structure of the mobile terminal of the invention.

FIG. 6 is a schematic diagram of the internal structure of a mobile terminal to which the above embodiment is applied.

Similarly, in the mobile terminal, taking ARM processor, X86 processor and USB HDD as example, that is, the first processor is ARM processor, the second processor is X86 processor, USB HDD is directly connected to ARM processor, the ARM processor and X86 processor share the USB HDD, and USB HDD may be selectively connected to the ARM processor or X86 processor based on whether the ARM processor has established a direct connection channel; in addition, the ARM processor can also transmit control signal (HDD_Power_Control) to the USB HDD, for controlling the USB HDD to power up or power down according to the usage condition of the USB HDD.

Wherein, the ARM processor controls that whether the USB HDD is powered up as well as establishing or disconnecting the direct connection channel between the X86 processor and USB HDD, because in the mobile terminal, the ARM processor is always in power up operating mode due to low power consumption, whereas the X86 processor may not be powered up for a time period due to high power consumption. Therefore, due to always being powered up, the ARM processor is more convenient and more direct than the X86 processor in terms of control logic. Further, due to employing GPIO interface to transmit control signaling, therefore, the ARM processor has a simpler control mode than the X86 processor.

When the ARM processor is controlling, in a case that the X86 processor is powered off or in deep sleep, the ARM processor may access the content of the USB HDD as required, at this time the ARM processor controls to disconnect the direct connection channel and accesses USB HDD as USB host end (USB Host); when operating alone, the ARM processor may also power off the USB HDD by transmitting HDD_Power_Control to reduce the power consumption of the mobile terminal; when the X86 processor is operating, the ARM processor establishes one transparent USB direct connection channel for bridging the X86 processor and USB HDD. At this time, the ARM processor just maintains this USB direct connection channel, controls USB HDD to power up by HDD_Power_Control, and enters standby state to save the power consumption of the mobile terminal.

Figure 7:
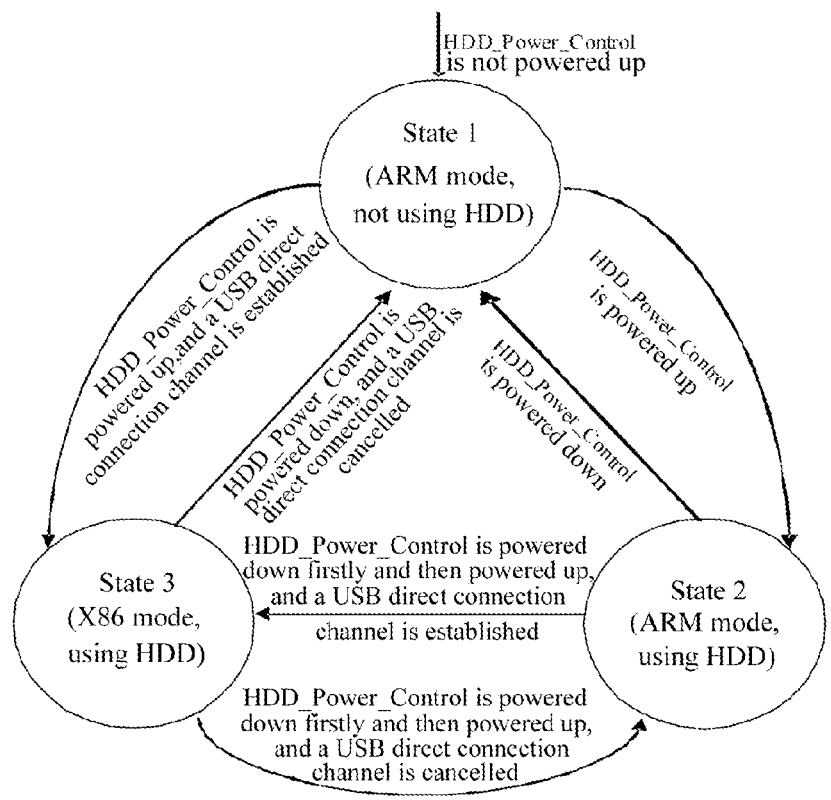
FIG. 7 is a schematic diagram of state transition of applying the third embodiment of the method of the invention.

FIG. 7 is schematic diagram of transition among states to which the above embodiment is applied. The transition process among respective states will be described below in conjunction with the structural representation of the mobile terminal as shown in FIG. 6, wherein the definition of states in which the mobile terminal may be omitted because it is same as that of FIG. 4.

Initially powering on and entering state 1: after the mobile terminal initially powered on, the USB HDD is connected to the ARM processor by default, and the ARM processor is not using the USB HDD, therefore the USB HDD is in a power down state in order to save power consumption.

Transiting from state 1 to state 2: when the ARM processor needs to use USB HDD, it transmits a HDD_Power_Control signal to the USB HDD to control it to be the powered up, at this time the ARM processor accesses the USB HDD as a host end of USB;

Transiting from state 2 to state 3: when t the X86 processor needs to use USB HDD, the ARM processor establishes a USB direct connection channel between the X86 processor and USB HDD. At this time the X86 processor may access the USB HDD via the USB direct connection channel as the host end of USB, meanwhile the ARM may further transmit HDD_Power_Control signal to the USB HDD, and control the USB HDD to power down firstly and then power up to ensure that the hard disk is in a normal condition when the X86 processor is operating;

Transiting from state 3 to state 1: when either the X86 processor or the ARM processor has no need to use USB HDD, the ARM processor disconnects the USB direct connection channel between the X86 processor and USB HDD, at the same time the ARM processor transmits HDD_Power_Control signal to the USB HDD to control the USB HDD to power down;

Transiting from state 1 to state 3: when the X86 processor needs to use USB HDD, the ARM processor establishes a USB direct connection channel between the X86 processor and USB HDD, at the same time the ARM processor transmits HDD_Power_Control signal to the USB HDD to control the USB HDD to power up;

Transiting from state 3 to state 2: when the ARM processor needs to use USB HDD, the ARM processor disconnects the USB direct connection channel between the X86 processor and USB HDD, at the same time the ARM processor may further transmit HDD_Power_Control signal to the USB HDD, and control the USB HDD to power down firstly and then power up to ensure that the hard disk is in a normal condition when the ARM processor is operating;

Transiting from state 2 to state 1: when the ARM processor does not need to use the USB HDD, it transmits a HDD_Power_Control signal to the USB HDD to control the USB HDD to power down.

It can be seen from above embodiment that, with compared with existing solution of sharing a storage device, the invention implements the sharing a storage device by maintaining the connection or disconnection of the USB direct connection channel between the X86 processor and USB HDD by ARM processor. Since only the ARM processor is required to control the USB HDD powering up or powering down and other extra hardware devices are not needed, the invention has a simple physical connection and logic control circuit among components in the mobile terminal, can be easily implemented by software, and further saves hardware cost as compared with the existing techniques. In addition, by the above internal structure of the mobile terminal, it is possible to realize accessing to the USB HDD commonly by X86 processor and ARM processor in the future.

Figure 8:
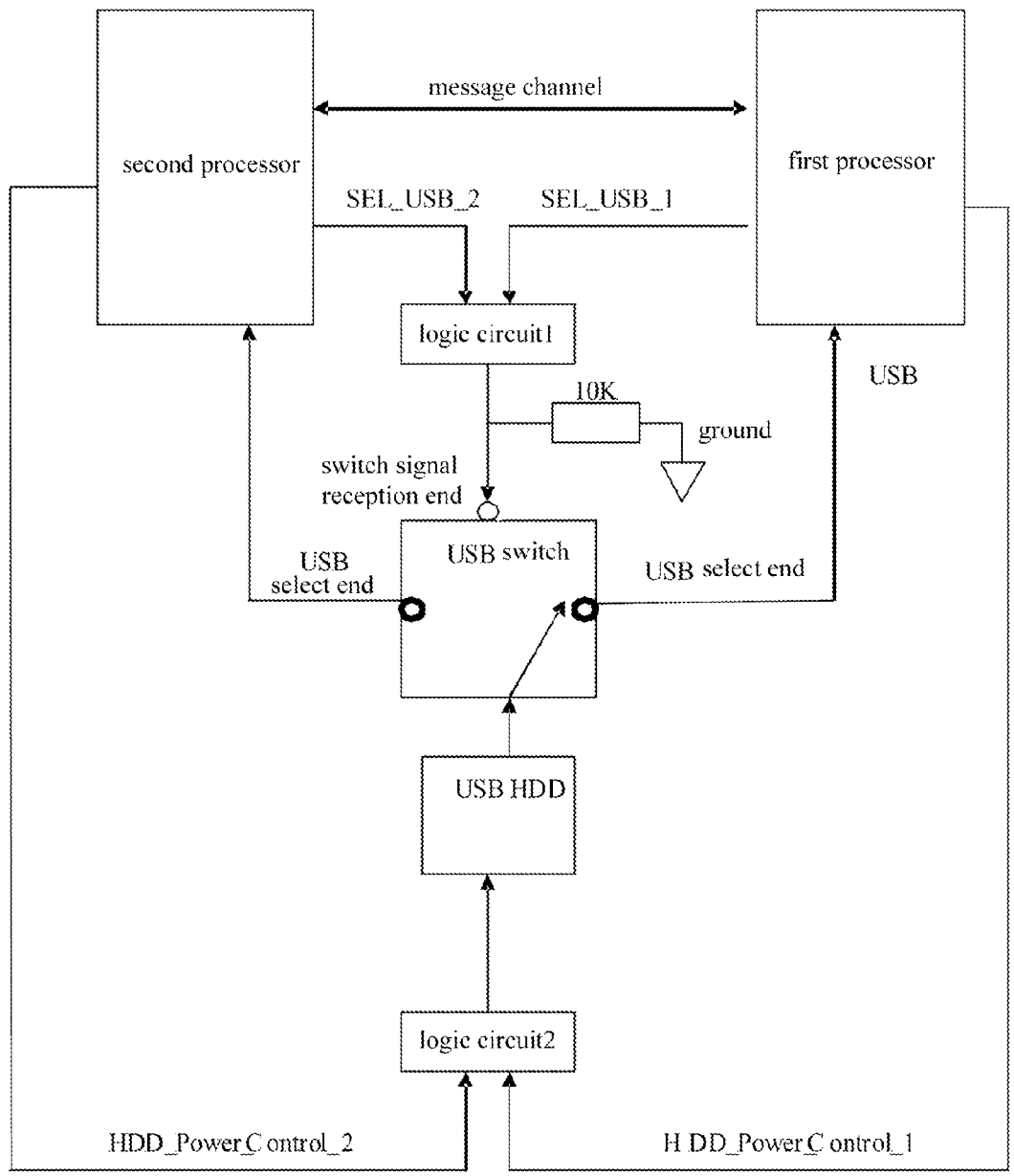
FIG. 8 is a schematic diagram of further another internal structure of the mobile terminal of the invention.

Another schematic diagram of the internal structure of the mobile terminal of the invention is shown in FIG. 8. The embodiment is different from the schematic diagrams of the internal structure of the above two mobile terminal embodiments in that, in the mobile terminal, the first processor and second processor may both initiate and conduct switching control to the switch, therefore there is no need to make one of the two processors be in starting state always.

Wherein, the USB switch may be controlled either by USB_SEL_1 of the first processor or USB_SEL_2 of the second processor, both of which are connected to the USB switch through a logic circuit 1. Before connected to the USB switch, they are connected to the ground through pull down resistor, which is USB switch default connection state.

A power up signal of USB HDD may be HDD_Power_Control_1 issued by the first processor or HDD_Power_Control_2 issued by the second processor, both of which are connected to USB switch through logic circuit 2.

There is a message channel between the first processor and second processor, which may be I2C, UART serial port and so on. The function of the message channel is communicating state information and message indicating whether to need to switch between the first processor and second processor.

The invention embodiment will be described below by one practical application scene.

Assuming that the X86 processor and ARM processor each having independent system coexist in one notebook computer, and for saving electricity, only state 1 is entered after power on, the user only uses ARM system in the notebook to get on-line, and the HDD does not operat.

During getting on-line, when the user finds useful image material and hopes to download it into HDD, the ARM processor automatically connects HDD to the ARM system, powers it up and makes it operate in response to file save command, thereby entering state 2.

After the download is finished, automatically or manually returns to state 1 or still maintaining state 2 according to the set policy or the user's selection. If it is required to use a picture editing software with higher complexity, such as Photoshop, to edit or modify the downloaded image material, state 3 is entered. Particularly, there may be an option for entering the X86 processor in the operation interface of the ARM processor. When the option is selected, the ARM processor notifies the X86 processor via a channel such as I2C or UART serial port etc., thereby controls the X86 processor to start-up and enter state 3. After finishing the start-up, the X86 processor informs the ARM processor again by the channel such as I2C or UART serial port etc. to enable the ARM processor to enter standby state.

When the X86 processor finishes the editing and modifying of the picture and saves and quits, if user wants to get on-line in a way of saving power, returns to state 1. Particularly, there may be an option for entering the ARM processor in the operation interface of the X86 processor. When the option is selected, the ARM processor notifies the ARM processor via a channel such as I2C or UART serial port etc., thereby controls the ARM processor to wake up and enter state 1 or state 2. After finishing the start-up, the ARM processor informs the X86 processor again by the channel such as I2C or UART serial port etc, to enable the X86 processor to sleep or power off.

The above application scene example is just one implementation, and there are various implementations in practice. For example, there may be two power on/off keys, one corresponding to ARM processor system and the other corresponding to X86 processor system, for controlling to enter which state. The details of which will not be described.

It should be noted that, the USB interface (USB switch, USB HDD) is used as example in the above embodiments, but PATA or SATA interfaces or the like may be used in practical application. If an interface which can not be directly supported by one processor is used, the PATA or SATA interface is converted to USB interface after controlling the switch and before accessing into the processor.

Furthermore, in the above embodiments, HDD is shown as an example of readable and writable nonvolatile storage, but other storage devices meeting the condition, such as SSD and the like, may also be used as the readable and writable nonvolatile storage.

In addition, in the mobile terminal of the above embodiment, the first processor is an ARM framework processor, and the second processor is an X86 framework processor, but they are just for illustration. Depending on specific types of the mobile terminal, the first processor and second processor may both be the ARM framework processors, or both be the X86 framework processors, or be other framework processors and the like. That is, there is no limitation to the combination of different kinds of processors to which the invention embodiment is applied, as long as the first processor and second processor are different and may process tasks with different complexity, and there are tasks that the first processor cannot process but the second processor can.

In addition, the mobile terminal device integrating two processors may be notebook computer (Notebook) or Netbook, Smartphone or personal digital assistant (PDA), or ultra-mobile personal computer (UMPC) or mobile internet device (MID) etc.

Corresponding to the embodiments of the method of sharing a storage device in the invention, the invention also provides embodiments of a mobile terminal using the method.

Figure 9:
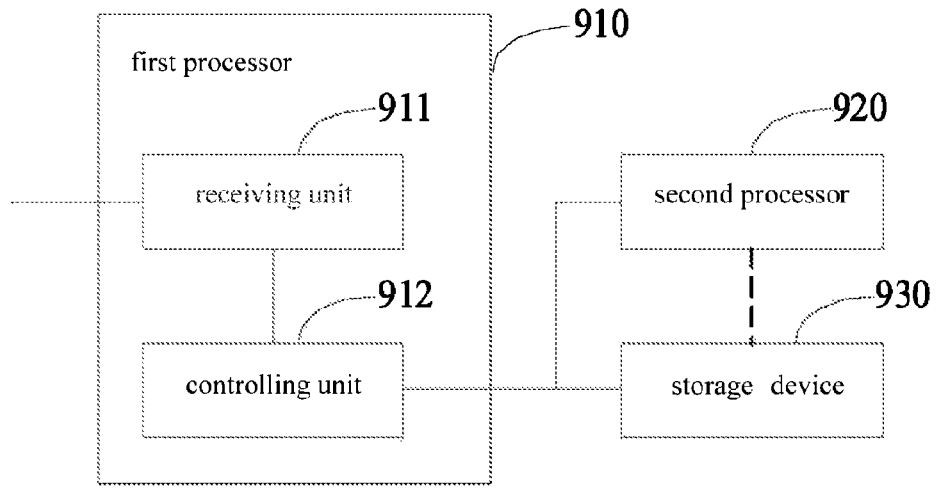
FIG. 9 is a block diagram of the first embodiment of the mobile terminal of the invention.

FIG. 9 shows the block diagram of the first embodiment of the mobile terminal of the invention. The mobile terminal comprises first processor 910, second processor 920 and readable and writable nonvolatile storage device 930. It is predefined that the state in which the first processor 910 is operating and using the storage device 930 is the second state, and the state in which the second processor 920 is operating and using the storage device 930 is the third state.

Wherein, the first processor 910 comprises:

A receiving unit 911, for receiving the switch instruction; controlling unit 912, for controlling the storage device 930 to enter the second state or the third state according to the switch instruction.

Figure 10:
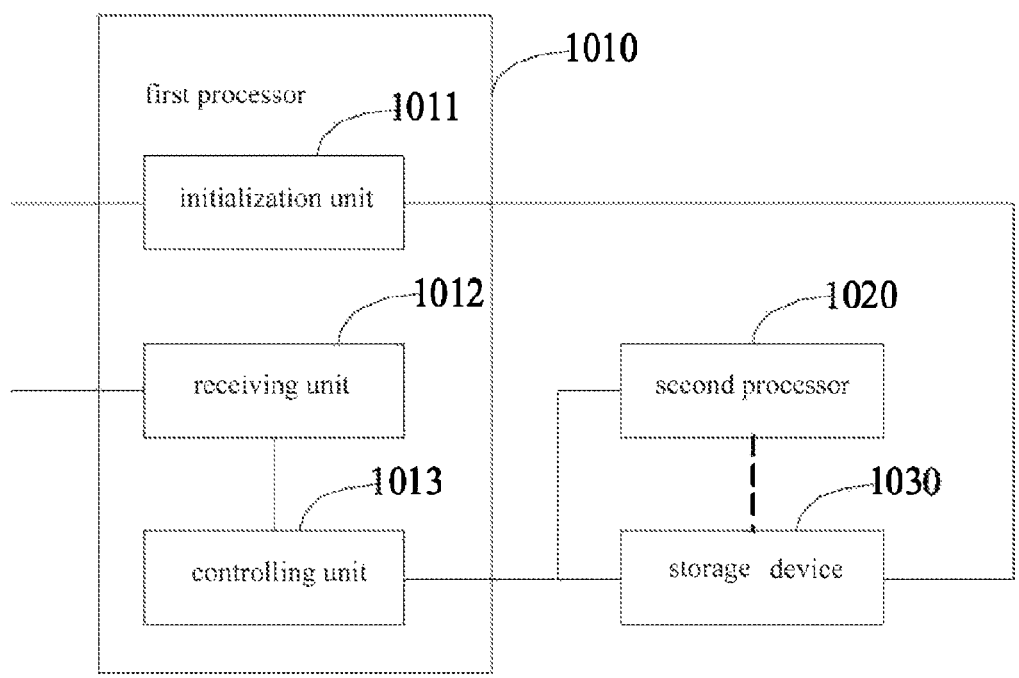
FIG. 10 is a block diagram of the second embodiment of the mobile terminal of the invention.

FIG. 10 shows the block diagram of the second embodiment of the mobile terminal of the invention. The mobile terminal comprises first processor 1010, second processor 1020 and readable and writable nonvolatile storage device 1030. It is predefined that the state in which the first processor 1010 is operating without using the storage device 1030 is the first state, the state in which the first processor 1010 is operating and using the storage device 1030 is the second state, and the state in which the second processor 1020 is operating and using the storage device 1030 is the third state.

Wherein, the first processor 1010 comprises:

An initialization unit 1011, for connecting to the storage device 1030 after the mobile terminal is powered on, and controlling the storage device 1030 to be in power down state wherein the mobile terminal enters the first state; a receiving unit 1012, for receiving switch instruction; a controlling unit 1013, for controlling the storage device 1030 to enter the second state in which it is used by the first processor 1010 or the third state in which it is used by the second processor 1020 according to the switch instruction.

Different units included in the receiving unit 1012 and controlling unit 1013 according to different states will be described in details below, which are not shown in FIG. 10.

Wherein, the receiving unit 1012 can also comprise: a first receiving unit for receiving an instruction for switching to the second state in the first state; accordingly, the controlling unit 1013 can also comprise: a first controlling unit for controlling the storage device 1030 to be in power up state according to the instruction. The mobile terminal enters the second state.

The receiving unit 1012 can also comprise: a second receiving unit for receiving an instruction for switching to the first state in the second state; the controlling unit can also comprise: a second controlling unit for controlling the storage device 1030 to be in power down state according to the instruction. The mobile terminal enters the first state.

The receiving unit 1012 can also comprise: a third receiving unit for receiving an instruction for switching to the third state in the second state; the controlling unit 1013 can also comprise: a third controlling unit for changing a switch which is set previously from being connected to the first processor 1010 to connected to the second processor 1020, and controlling the storage device 1030 to be in power up state. The mobile terminal enters the third state. Alternatively, the third controlling unit establishes a direct connection channel between the storage device 1030 and the second processor 1020, and controlling the storage device 1030 to be in power up state. The mobile terminal enters the third state.

The receiving unit 1012 can also comprise: a fourth receiving unit for receiving an instruction for switching to the second state in the third state; the controlling unit 1013 can also comprise: a fourth controlling unit for changing a switch which is set previously from being connected to the second processor 1020 to being connected to the first processor 1010, and controlling the storage device 1030 to be in power up state. The mobile terminal enters the second state. Alternatively, the fourth controlling unit disconnects the established direct connection channel between the storage device 1030 and the second processor 1020, and controlling the storage device 1030 to be in power up state. The mobile terminal enters the second state.

The receiving unit 1012 can also comprise: a fifth receiving unit for receiving an instruction for switching to the first state in the third state; the controlling unit 1013 can also comprise: a fifth controlling unit for changing a switch which is set previously from being connected to the second processor 1020 to being connected to the first processor 1010, and controlling the storage device 1030 to be in power down state. The mobile terminal enters the first state. Alternatively, the fifth controlling unit disconnects the established direct connection channel between the storage device 1030 and the second processor 1020, and controlling the storage device 1030 to be in power down state. The mobile terminal enters the first state.

The receiving unit 1012 can also comprise: a sixth receiving unit for receiving an instruction for switching to the third state in the first state; the controlling unit 1013 can also comprise: a sixth controlling unit for changing a switch which is set previously from being connected to the first processor 1010 set previously to being connected to the second processor 1020, and controlling the storage device 1030 to be in power up state. The mobile terminal enters the third state. Alternatively, the sixth controlling unit establishes a direct connection channel between the storage device 1030 and the second processor 1020, and controlling the storage device 1030 to be in power up state. The mobile terminal enters the third state.

It can be seen from the above description of implementations, the embodiments of the invention are applied to a mobile terminal having a first processor, a second processor and a storage device, wherein the first processor controls the storage device to enter a second state in which it is used by the first processor or a third state in which it is used by the second processor after receiving a switch command. Therefore, as compared with the prior art, by controlling the sharing of the storage device by the first processor, the invention has a technical effect of reducing the elements in the mobile terminal and saving the hardware cost of the mobile terminal; moreover, the physical connection between the components in the mobile terminal is simple and easily controlled.

It can be well understood by those skilled in the art that, the invention can be implemented by software on essential general hardware platform. Based on this, the technical solution of the invention or the parts contributing to the prior art may be substantially embodied in the form of computer software product which may be stored in storage media, such as ROM/RAM, disk, optical disk and the like, comprising some instructions to enable a computer system (may be personal computer, server or web device and the like) to execute the methods of the invention embodiments or certain parts thereof.

For example, the computer program product of the invention may comprise computer usable media implementing computer usable program. The computer usable program may be incorporated in the above mobile terminal to: enable the first processor to receive a switch instruction; enable the first processor to control the storage device to enter second state or the third state according to the switch instruction.

The above implementations of the invention are not limiting the scope of the invention. Any modification, equivalent replacement and improve and the like within the spirit and principle of the invention should be contained in the scope of the invention.

What is claimed is:

1. A method of sharing a memory device, applicable to a mobile terminal comprising a first processor, a second processor, a switch circuit and a readable and writable nonvolatile memory device, wherein a processing capacity of the first processor is different from that of the second processor, the method comprising:

in a case that the mobile terminal is initially powered on, the mobile terminal is in a first state in which the memory is connected to the first processor by default, and the first processor is not using the memory; or in a case that the first processor needs to use the memory in the first state, a control signal is transmitted to the memory to control the memory to be powered up, to switch the mobile terminal into a second state, in which the first processor accesses the memory as a host end; or in a case that the second processor needs to use the memory in the second state, the first processor establishes a direct connection channel between the second processor and the memory, and the first processor transmit the control signal to the memory to control the memory to be powered down firstly and then powered up to switch the mobile terminal into a third state, in which the second processor accesses the memory via the direct connection channel as the host end; or in a case that the first processor or the second processor does not need to use the memory in the third state, the first processor disconnects the direction connection between the second processor and the first processor transmits the control signal to the memory to control the memory to be powered down, to switch the mobile terminal into the memory to switch into the first state; or in a case that the second processor needs to use the memory in the first state, the first processor establishes the direct connection between the second processor and the memory and the first processor transmits the control signal to the memory to control the memory to be powered up, to switch the mobile terminal into the third state; or in a case that the first processor needs to use the memory in the third state, the first processor disconnects the direction connection between the second processor and the memory, and the first processor transmits the control signal to the memory and control the memory to be powered down firstly and then powered up, to switch the mobile terminal into the second state; or in a case that the first processor does not need to use the memory, the first processor transmits the control signal to the memory to control the memory to be powered down, to switch the mobile terminal into the first state.

2. The method according to claim 1, wherein the first processor is an ARM processor.

3. The method according to claim 1, wherein the second processor is an X86 processor.

4. The method according to claim 1, wherein the memory is a USB hard disk.

5. A mobile terminal comprising:
a first processor;
a second processor;

a switch circuit; and
a readable and writable nonvolatile memory device,
wherein a processing capacity of the first processor is different from that of the second processor;
in a case that the mobile terminal is initially powered on, the mobile terminal is in a first state in which the memory is connected to the first processor by default, and the first processor is not using the memory; or
in a case that the first processor needs to use the memory in the first state, a control signal is transmitted to the memory to control the memory to be powered up, to switch the mobile terminal into a second state, in which the first processor accesses the memory as a host end; or
in a case that the second processor needs to use the memory in the second state, the first processor establishes a direct connection channel between the second processor and the memory, and the first processor transmit the control signal to the memory to control the memory to be powered down firstly and then powered up to switch the mobile terminal into a third state, in which the second processor accesses the memory via the direct connection channel as the host end; or
in a case that the first processor or the second processor does not need to use the memory in the third state, the first processor disconnects the direction connection between the second processor and the first processor transmits the control signal to the memory to control the memory to be powered down, to switch the mobile terminal into the memory to switch into the first state; or
in a case that the second processor needs to use the memory in the first state, the first processor establishes the direct connection between the second processor and the memory and the first processor transmits the control signal to the memory to control the memory to be powered up, to switch the mobile terminal into the third state; or
in a case that the first processor needs to use the memory in the third state, the first processor disconnects the direction connection between the second processor and the memory, and the first processor transmits the control signal to the memory and control the memory to be powered down firstly and then powered up, to switch the mobile terminal into the second state; or
in a case that the first processor does not need to use the memory, the first processor transmits the control signal to the memory to control the memory to be powered down, to switch the mobile terminal into the first state.

6. The mobile terminal according to claim 5, wherein the first processor is an ARM processor.

7. The mobile terminal according to claim 5, wherein the second processor is an X86 processor.

8. The mobile terminal according to claim 5, wherein the memory is a USB hard disk.

9. A computer readable non-transitory storage media embodying software, which, when being executed by a processor of a computer, performs the method according to claim 1.

* * * * *